US006663034B1

(12) United States Patent
Johnson et al.

(10) Patent No.: US 6,663,034 B1
(45) Date of Patent: Dec. 16, 2003

(54) DATA STORAGE TAPE CARTRIDGE WITH DATUM PADS FOR REGISTRATION WITH A TAPE DRIVE

(75) Inventors: Michael W. Johnson, Cottage Grove, MN (US); Christian A. Todd, Thornton, CO (US)

(73) Assignees: Imation Corp., Oakdale, MN (US); Storage Technology Corp., Louisville, CO (US)

( * ) Notice: Subject to any disclaimer, the term of this patent is extended or adjusted under 35 U.S.C. 154(b) by 84 days.

(21) Appl. No.: 09/698,751

(22) Filed: Oct. 27, 2000

(51) Int. Cl.$^7$ ............................................. G03B 23/02
(52) U.S. Cl. ................. 242/348.2; 242/338.4; 360/96.5; 360/132
(58) Field of Search ............................. 242/338.4, 348, 242/348.2; 360/132, 96.5

(56) References Cited

U.S. PATENT DOCUMENTS

| 3,650,378 | A | | 3/1972 | Kakiuchi et al. |
| 3,857,531 | A | | 12/1974 | Jantzen |
| 4,775,115 | A | | 10/1988 | Gelardi |
| 5,053,902 | A | | 10/1991 | Kato |
| 5,209,425 | A | | 5/1993 | Krabbenhoft et al. |
| 5,262,918 | A | | 11/1993 | Tannert |
| 5,280,403 | A | | 1/1994 | Martin |
| 5,465,187 | A | | 11/1995 | Hoge et al. |
| 5,969,913 | A | | 10/1999 | Vanderheyden et al. |
| 6,057,980 | A | * | 5/2000 | Todd et al. ................. 360/96.5 |
| 6,069,777 | A | | 5/2000 | Vanderheyden et al. |

* cited by examiner

*Primary Examiner*—John Q. Nguyen
(74) *Attorney, Agent, or Firm*—Dicke, Billig & Czaja, PLLC

(57) ABSTRACT

A data storage tape cartridge is disclosed including a housing, a single tape reel, a storage tape, and a leader block. The housing includes a front, a back, a first side, a second side, a top, and a bottom. Further, the housing forms a leader block window, a lateral datum pad, and a longitudinal datum pad. The leader block window is formed at a corner defined by the front and the first side. The lateral datum pad is formed in the top. Finally, the longitudinal datum pad is formed in the front. The single tape reel is rotatably maintained within the housing. The storage tape is wrapped about the tape reel. The leader block is coupled to a leading end of the storage tape and is selectively secured to the housing at the leader block window. With this configuration, the lateral datum pad is configured to identify a top-to-bottom position of the tape reel. Similarly, the longitudinal datum pad is configured to identify a front-to-back position of the tape reel. In one preferred embodiment, the housing is formed from a plastic material and the datum pads are molded into the housing. In another preferred embodiment, the housing forms a registration slot for identifying a side-to-side position of the tape reel. Regardless, upon insertion of the data storage tape cartridge into a tape drive, the datum pads are engaged by corresponding registration devices of the tape drive to precisely align the tape reel. In another preferred embodiment, the first side forms a retention tab for selectively securing the leader block, and first and second notches above and below, respectively, the retention tab.

34 Claims, 7 Drawing Sheets

DATA STORAGE TAPE CARTRIDGE WITH DATUM PADS FOR REGISTRATION WITH A TAPE DRIVE

BACKGROUND OF THE INVENTION

The present invention relates to a data storage tape cartridge for use with a tape drive as part of a tape drive system. More particularly, it relates to a single reel data storage tape cartridge having datum pads that provide enhanced registration and alignment with the tape drive.

Data storage tape cartridges and tape drive systems have been used for decades in the computer, audio, and video fields to record and store large volumes of information for subsequent retrieval and use. In general terms, a data storage tape drive system includes a data storage tape cartridge and a tape drive. The data storage tape cartridge consists basically of an outer shell or housing maintaining at least one tape reel and a length of magnetic storage tape. The storage tape is wrapped about a hub portion of the tape reel(s) that, in turn, is rotatably disposed within the housing. The housing typically includes a separate cover and base, the combination of which forms an opening (or window) at a forward portion thereof for allowing access to the storage tape upon insertion of the tape cartridge into the tape drive. The tape drive includes transducers, such as magnetic read/write heads, for recording data to, or reading data from, the storage tape.

The interaction between storage tape and heads may take place within the housing (for example, with a mid-tape load design). With this approach, the cartridge includes two tape reels to drive the storage tape through a precise tape path relative to the window. Because the tape path is essentially confined to the housing, the tape drive cannot readily compensate for positioning errors of the tape cartridge relative to the tape drive. In light of this constraint, numerous efforts have been made to incorporate registration features into dual reel tape cartridges, and related tape drives.

An alternative tape drive system technique is to direct the storage tape outwardly and away from the cartridge housing to an adjacent area within the tape drive at which the read/write head(s) is located. With this approach, the tape cartridge has a single tape reel about which the storage tape is wrapped. Further, a leader block is secured to a leading end of the storage tape, and is configured for engagement with a threader mechanism and take-up reel associated with the tape drive. The threader mechanism directs the leader block, and thus the storage tape, out from the cartridge housing, through a tape path that includes interaction with the read/write head(s), and to the take-up reel. As compared to a dual reel design, a single reel tape cartridge can maintain an increased length of storage tape, and requires less housing space.

Because the tape path is essentially defined by the tape drive, existing single reel tape drive systems are unconcerned with precise registration of the tape cartridge to the tape drive. More particularly in addition to the take-up reel used to engage the leader block, the single reel tape drive includes a drive hub configured to engage and rotate the tape reel, along with a receiving frame within which the data storage tape cartridge is inserted. The receiving frame only generally positions the tape cartridge relative to, or above, the drive hub that is then maneuvered so as to engage the tape reel. To this end, single reel prior tape drive systems compensate for certain variations in positioning of the tape cartridge, and in particular the tape reel, relative to the drive hub. For example, with currently available single reel/hub tape drives, the drive hub typically has vertical movement capabilities in the range of approximately 0.5 inch, as well as an ability to accommodate radial alignment deviations on the order of 0.1 inch. Thus, the drive hub can be maneuvered to account for misalignments with the tape reel. Further, even if the drive hub is slightly off-center relative to an axis or center of the tape reel upon engagement therebetween, this misalignment has little affect on positioning of the storage tape relative to the read/write head(s) as the storage tape is directed through a tape path (or extension from the cartridge housing) having a length in upwards of 12 inches, providing a sufficient distance along which storage tape positioning corrections can be made.

As with other technology-based industries, evolution of data storage tape drive systems is focused upon increased capacity and operational speed, while at the same time reducing an overall size of the system. For example, efforts have been made to reduce the size of tape drives for use with single reel data storage tape cartridges. Implementation of this desired goal requires greatly reducing a length of the tape path (or distance that the storage tape is extended from the cartridge housing) to approximately 1 inch. Similarly, drive hubs have been redesigned to allow for only slight movements, on the order of 0.1 inch vertically and 0.01 inch in all other directions, it being understood that a reduction of even 0.001 inch can have a significant effect on the overall tape drive size. These alterations have placed a greater emphasis on precise alignment of the tape cartridge, and in particular the tape reel, relative to the drive hub upon insertion within the tape drive. Unfortunately, currently available single reel data storage tape cartridges and related tape drives cannot provide for this now necessary, precise alignment.

In addition to satisfying registration requirements, any newly designed single reel data storage tape cartridge must remain compatible with other handling equipment commonly employed. For example, library systems, available for example from Storage Technology Corp. of Louisville, Colo. are utilized to organize and store a large volume of data storage tape cartridges. In this regard, the library system typically includes a housing that maintains a series of individual cartridges at known positions for retrieval by a robotic pick-and-place device. In this regard, the housing includes "standard" positioning features that locate each individual cartridge at a position that is "known" by the robot. Thus, any newly designed data storage tape cartridge must be configured for proper interaction with these standard positioning features.

Single reel data storage tape drive systems have evolved to the point where precise cartridge/drive alignment is now required. Unfortunately, currently available single reel cartridges are not designed to provide this precise alignment. Therefore, a need exists for a single reel data storage tape cartridge and associated tape drive that facilitates precise registration and preferably is compatible with other commonly used handling devices.

SUMMARY OF THE INVENTION

One aspect of the present invention relates to a data storage tape cartridge including a housing, a single tape reel, a storage tape, and a leader block. The housing includes a front, a back, a first side, a second side, a top, and a bottom. Further, the housing forms a leader block window, a lateral datum pad, and a longitudinal datum pad. The leader block window is formed at a corner defined by the front and the first side. The lateral datum pad is formed in the top. Finally, the longitudinal datum pad is formed in the front. The single tape reel is rotatably maintained within the housing. The storage tape is wrapped about the tape reel. The leader block is coupled to a leading end of the storage tape and is selectively secured to the housing at the leader block window. With this configuration, the lateral datum pad is configured to identify a top-to-bottom position of the tape reel. Similarly, the longitudinal datum pad is configured to identify a front-to-back position of the tape reel. In one preferred embodiment, the housing is formed from a plastic material and the datum pads are molded into the housing. Regardless, upon insertion of the data storage tape cartridge into a tape drive, the datum pads are engaged by corresponding registration devices of the tape drive to precisely align the tape cartridge housing, and thus the tape reel.

Another aspect of the present invention relates to a data storage tape cartridge including a housing, a single tape reel, and a leader block. The housing is defined by a front, a back, a first side, a second side, a top, and a bottom. Further, the housing forms a leader block window, first and second lateral datum pads, first and second longitudinal datum pads, and a registration slot. The leader block window is formed at a corner defined by the front and the first side. The lateral datum pads are formed in the top. The longitudinal datum pads are formed in the front. Finally, the registration slot is formed at the front and extends along the bottom. The single tape reel is rotatably maintained within the housing. The leader block is coupled to a leading end of the storage tape and is selectively secured to the housing at the leader block window. With this configuration, the lateral datum pads are configured to identify a top-to-bottom position of the tape reel. The longitudinal datum pads are configured to identify a front-to-back position of the tape reel. Finally, the registration slot is configured to define a side-to-side position of the tape reel.

Another aspect of the present invention relates to a data storage tape drive system including a data storage tape cartridge and a tape drive. The data storage tape cartridge includes a housing, a single tape reel, a storage tape, and a leader block. The housing includes a front, a back, a first side, a second side, a top, and a bottom. Further, the housing forms a leader block window, a lateral datum pad and a longitudinal datum pad. The leader block window is formed at a corner defined by the front and the first side. The lateral datum pad is formed in the top. Finally, the longitudinal datum pad is formed in the front. The single tape reel is rotatably maintained within the housing. The storage tape is wrapped about the tape reel. The leader block is coupled to a leading end of the storage tape and is selectively secured to the housing at the leader block window. The tape drive includes a receiving frame, a rotatable drive hub, a lateral registration device, and a longitudinal registration device. The drive hub is associated with the receiving frame as configured to engage the tape reel. Similarly, the registration devices are also associated with the receiving frame. With this configuration, the lateral datum pad is engaged by the lateral registration device and the longitudinal datum pad is engaged by the longitudinal registration device when the tape cartridge is inserted within the receiving frame. In one preferred embodiment, interaction between the lateral datum pad and the lateral registration device positions the tape reel a precise distance above the drive hub. In another preferred embodiment, the tape reel has a front-to-back position relative to the housing and the drive hub has a front-to-back position relative to the receiving frame, with the longitudinal datum pad and longitudinal registration device being con-figured such that engagement therebetween aligns the front-to-back position of the tape reel with the front-to-back position of the drive hub. In yet another preferred embodiment, the housing forms a registration slot sized to receive a guide post associated with the tape drive for aligning a side-to-side position of the tape reel with a side-to-side position of the drive hub.

Another aspect of the present invention relates to a data storage tape cartridge including a housing, a tape reel, a storage tape, and a leader block. The housing includes a front, a back, a first side, a second side, a top, and a bottom. Further, the housing forms a leader block window at a corner defined by the front and the first side. With this configuration in mind, the first side forms a retention tab adjacent the leader block window and a notch between the retention tab and the top. The tape reel is rotatably disposed within the housing. The storage tape is wrapped about the tape reel. The leader block is coupled to a leading end of the storage tape and is selectively secured to the housing at the leader block window by the retention tab. With this configuration, the slot formed by the housing allows the data storage tape cartridge to be used with a variety of handling devices, while still properly maintaining the leader block when not in use.

DESCRIPTION OF THE PREFERRED EMBODIMENTS

Figure 1:
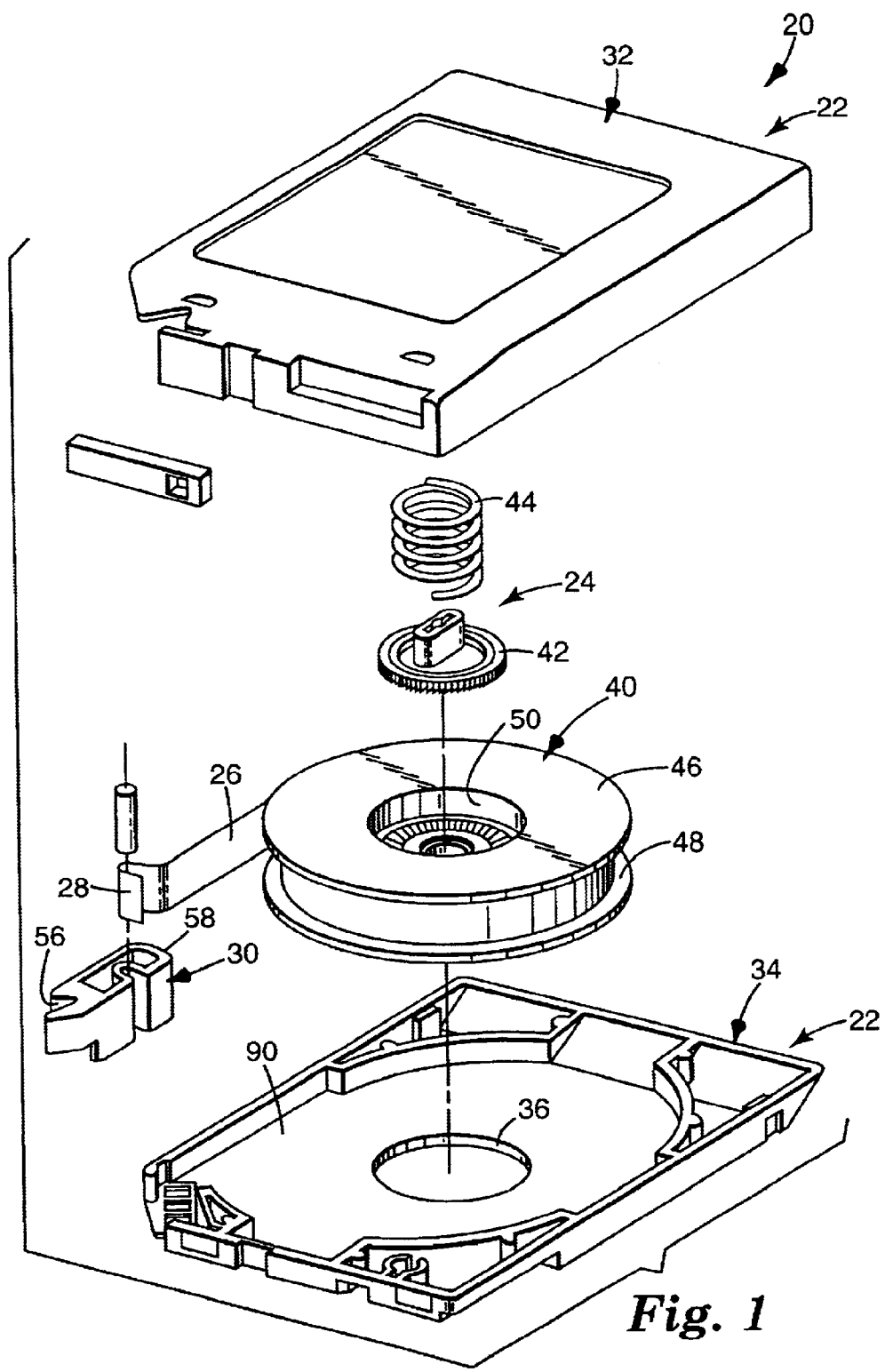
FIG. 1 is an exploded, perspective view of a data storage tape cartridge in accordance with the present invention.

One preferred embodiment of a data storage tape cartridge 20 in accordance with the present invention is shown in FIG. 1. In general terms, the data storage tape cartridge 20 includes a housing 22, a tape reel assembly 24, and a storage tape 26. The tape reel assembly 24 is rotatably disposed within the housing 22. The storage tape 26, in turn, is wound about a portion of the tape reel assembly 24 and includes a free-end 28 attached to a leader block 30.

The housing 22 is preferably sized in accordance with industry-accepted tape drive form factors. Thus, the housing 22 can assume a form factor size of approximately 125 mm×110 mm×21 mm, although other form factors or dimensions are equally acceptable. Regardless, the housing 22 is preferably formed by a cover 32 and a base 34 configured to be reciprocally mated to one another.

The cover 32 and the base 34 define or otherwise form a number of additional features that are best illustrated with reference to the housing 22 in a final, assembled position. Thus, these features are described in greater detail below. However, with respect to the exploded view of FIG. 1, the base 34 forms a central opening 36 through which access to the tape reel assembly 24 is provided.

The tape reel assembly 24 preferably includes a tape reel 40, a brake 42, and a spring 44. The tape reel 40 is generally comprised of an upper flange 46, a lower flange 48, and a hub ring 50, and is sized to receive the brake 42 and the spring 44. The storage tape 26 is wound about the hub 50, constrained laterally by the flanges 46, 48. As is known in the art, the brake 42 is slidably connected to a tab (not shown) extending inwardly from the cover 32. Further, the spring 44 biases the brake 42 into selective engagement with a portion of the tape reel 40. In this engaged position, the brake 42 prevents movement of the tape reel 40. During use, a drive chuck (not shown) directs the brake 42 away from the tape reel 40, such that the tape reel 40 is free to rotate. Alternatively, other configurations for the tape reel assembly 24 known in the art are equally acceptable.

The storage tape 26 is preferably a magnetic tape of a type commonly known in the art. For example, the storage tape 26 can consist of a balanced polyethylene naphthalate (PEN) based material coated on one side with a layer of magnetic material dispersed within a suitable binder system, and on the other side with a conductive material dispersed within a suitable binder system. Acceptable magnetic tape is available, for example, from Imation Corp., of Oakdale, Minn.

As previously described, the free end 28 of the storage tape 26 is coupled to the leader block 30. A front surface of the leader block 30 includes a slot 56 for engaging in automatic threading apparatus of a tape drive (not shown), and is configured to be selectively secured to the housing 22 as described in greater detail below. A rear surface 58 is rounded to form a portion of an arc of a radius to match the periphery of the take-up reel (not shown) in the tape drive as the leader block 30 fits into a slot in the take-up reel. Alternatively, the leader block 30 may assume other forms known in the art.

Figure 2:
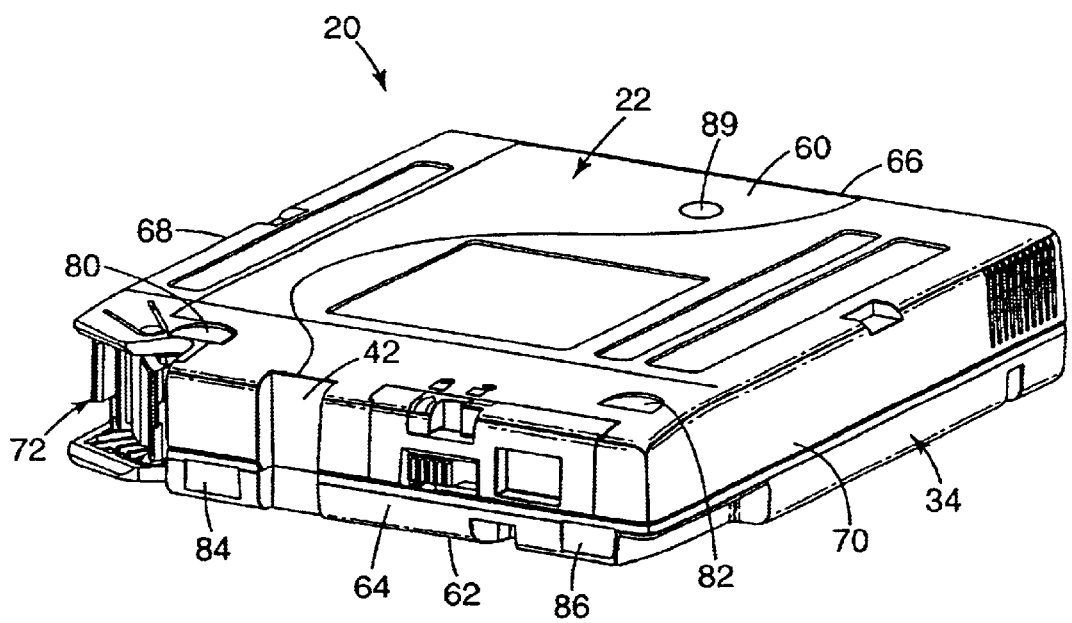
FIG. 2 is a top, perspective view of the cartridge of FIG. 1 upon final assembly.
Figure 3:
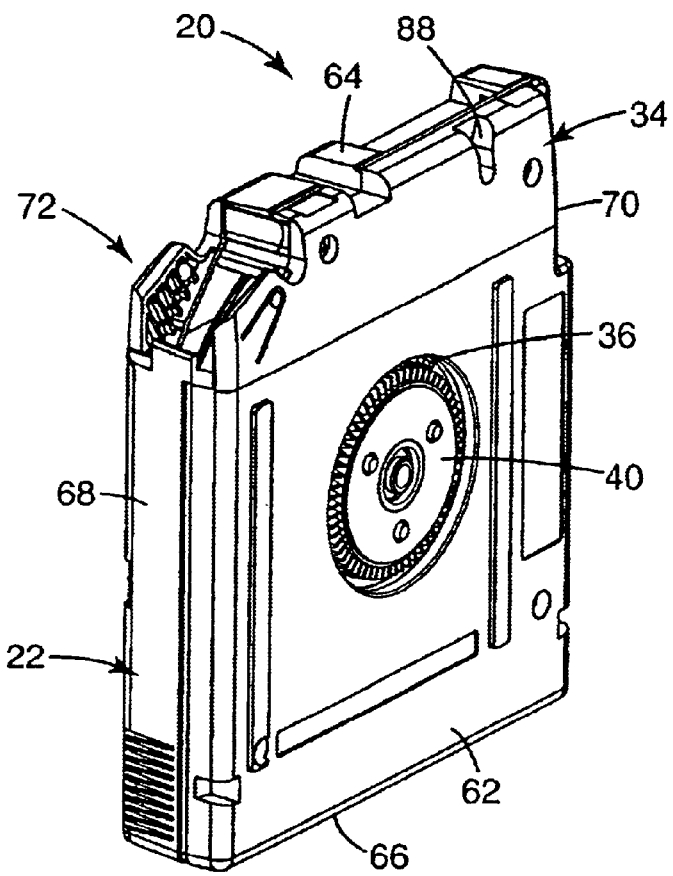
FIG. 3 is a bottom, perspective view of the cartridge of FIG. 2.

The data storage tape cartridge 20 is depicted in a final, assembled form in FIGS. 2 and 3. Upon final assembly, the housing 22 is defined by a top 60 (FIG. 2), a bottom 62 (FIG. 3), a front 64, a back 66 (hidden in the figures), a first side 68 (best shown in FIG. 3), and a second side 70 (best shown in FIG. 2). It should be understood that as used throughout the specification, directional terminology, such as "top," "bottom," "front," "back," etc., are used for purposes of illustration only and are in no way limiting. With these general surface definitions in mind, the housing 22 forms a leader block window 72 at a corner defined by the front 64 and the first side 68. As is known in the art, the housing 22 is configured to selectively retain the leader block 30 within the leader block window 72. In addition, the housing 22 forms several registration features. For example, in one preferred embodiment, the housing 22 forms a first lateral datum pad 80, a second lateral datum pad 82, a first longitudinal datum pad 84, a second longitudinal datum pad 86, a registration slot 88, and a tilt datum point 89. Details on each of the features 80-88 are provided below.

The first and second lateral datum pads 80, 82 are formed in the top 60 of the housing 22. As described in greater detail below, the lateral datum pads 80, 82 are configured to identify a top-to-bottom (or lateral) position of the tape reel 40 (shown partially in FIG. 3). More particularly, the lateral datum pads 80, 82 are precisely positioned relative to an inner surface (identified at 90 in FIG. 1) of the bottom 62 as otherwise formed by the base 34. Prior to use, the tape reel 40 abuts this inner surface 90 such that a lateral or top-to-bottom position of the tape reel 40 can be precisely identified with reference to the lateral datum pads 80, 82. Conversely, the tape reel 40 can be directed to a precise top-to-bottom or lateral location through engagement and guiding of the lateral datum pads 80, 82.

In a preferred embodiment, the lateral datum pads 80, 82 are aligned relative to the front 64, with the first lateral datum pad 80 being positioned adjacent the leader block - window 72 and the second lateral datum pad 82 positioned adjacent the second side 70. In one preferred embodiment, a center of each of the lateral datum pads 80, 82 is positioned 0.525 inch from the front 64 and are spaced by a distance in the range of 2.8–3.2 inches, more preferably 2.93 inches. Other dimensions are also acceptable. However, it is preferred that the lateral datum pads 80, 82 be positioned as close as possible to the respective sides 68, 70 to compensate for potential flatness variations in a remainder of the top 60. Further, by locating the lateral datum pads 80, 82 in close proximity to the front 64, corresponding registration devices (not shown) associated with a tape drive (not shown) can be more conveniently positioned to engage the lateral datum pads 80, 82. The lateral datum pads 80, 82 are preferably formed to be co-planar with one another, such as during a molding process as described below. With this preferred planar attribute, engagement of the lateral datum pads 80, 82 controls a lateral skew of the housing 22, and thus of the tape reel 40. Finally, while the lateral datum pads 80, 82 have been depicted as assuming a semi-circular form, a variety of other shapes are equally acceptable (e.g., square, rectangular, circular, etc.). In one preferred embodiment, however, the lateral datum pads 80, 82 are each formed to define an outer dimension of 0.375 inch.

The longitudinal datum pads 84, 86 are formed in the front 64 and identify a front-to-back (or longitudinal) position of the tape reel 40. More particularly, the longitudinal datum pads 84, 86 are formed at a precise location relative to an axis of the central opening 36. Because the tape reel 40 is axially aligned with the central opening 36, then, the longitudinal datum pads 82, 84 are precisely positioned relative to a central axis or center of the tape reel 40. Thus, where a location of the longitudinal datum pads 84, 86 is known, a position of the tape reel 40 relative to the front 64 (or a front-to-back location) of the tape reel 40 is similarly known. Conversely, the tape reel 40 can be directed to a desired front-to-back position via engagement and guiding of the longitudinal datum pads 84, 86.

With the above relationship in mind, the longitudinal datum pads 84, 86 are preferably aligned relative to the bottom 62, with the first longitudinal datum pad 84 being positioned adjacent the leader block window 72 and the second longitudinal datum pad 86 being positioned adjacent the second side 70. As with the lateral datum pads 80, 82, the longitudinal datum pads 84, 86 are preferably spaced by an appreciable distance, on the order of 2–2.5 inches, more preferably 2.185 inches. This preferred positioning accommodates other features associated with the data storage tape cartridge 20, while compensating for potential flatness deviations in the housing 22. The longitudinal datum pads 84, 86 are preferably formed to be co-planar, such as part of a molding process described below. With this preferred planar attribute, engagement of the longitudinal datum pads 84, 86 controls a longitudinal skew of the housing 22, and thus of the tape reel 40. While the longitudinal datum pads 84, 86 are preferably illustrated as assuming a rectangular configuration, other shapes are equally acceptable. Regardless, in one preferred embodiment, the longitudinal datum pads 84, 86 are each formed to define an outer dimension of approximately 0.375 inch.

In a preferred embodiment, the housing 22 is formed of a plastic material. With this in mind, and in a preferred embodiment, each of the datum pads 80–86 are molded into the housing 22, formed to have zero draft. As a result, the datum pads 80–86 are preferably formed as slight impressions relative to a remainder of the housing 22 exterior surrounding each of the pads 80, 86. With the zero draft molding approach, the lateral datum pads 80, 82 are square to one another, as are the longitudinal datum pads 84, 86. As previously described, this relationship renders the respective datum pads pairs 80, 82 and 84, 86 available to dictate and control a skew of the housing 22, and thus of the tape reel 40.

Figure 4:
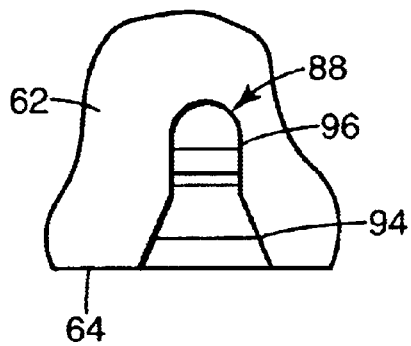
FIG. 4 is an enlarged, bottom view of a portion of the cartridge of FIG. 1.

The registration slot 88 extends from the front 64 along a portion of the bottom 62. More particularly, and as best shown in FIG. 4, the registration slot 88 is open at both the front 64 and the bottom 62, and is preferably defined by a first section 94 and a second section 96. The first section 94 extends from the front 64, preferably tapering in width. This preferred tapered configuration assists in directing a guide post (not shown) otherwise associated with a tape drive (not shown) into the second section 96. Second section 96, in turn, is configured to receive and retain the guide post.

Returning to FIGS. 2 and 3, the registration slot 88 is configured to define a side-to-side position of the tape reel 40. Once again, the registration slot 88 is precisely formed to have a known position relative to the axis or center of the central opening 36, and thus of the tape reel 40. More particularly, the registration slot 88 is formed a precise distance from the first side 68, as is the axis or center of the central opening 36. Thus, by engaging the registration slot 88, a position of the axis or center of the central opening 36, and thus of the tape reel 40, relative to the first side 68 is known. Conversely, by directing the data storage tape cartridge 20 via engagement with and guiding of the registration slot 88, the tape reel 40 can be positioned at a known side-to-side location.

Finally, in one preferred embodiment, the housing 22 defines the tilt datum point 89 in the top 60 thereof. The tilt datum point 89 is located near the back 66, and provides an indication of a tilt or zenieth of the housing 22, and thus the tape reel 40, from the front 64 to the back 66. In other words, by locating the tilt datum point 89 near the back 66, reference to the tilt datum point 89 in conjunction with the lateral datum pads 80, 82 allows a tilt or zenieth of the housing 22 to be determined and controlled. Effectively, the lateral datum pads 80, 82 and the tilt datum point 89 provide a tertiary level of control/alignment. Because tilt or zenieth is relatively easy to control, the tilt datum point 89 need not be formed as a zero draft pad, and can be located at a number of different positions or surfaces. Even further, with an appropriately designed tape drive, the tilt datum point 89 can be eliminated entirely.

Figure 5:
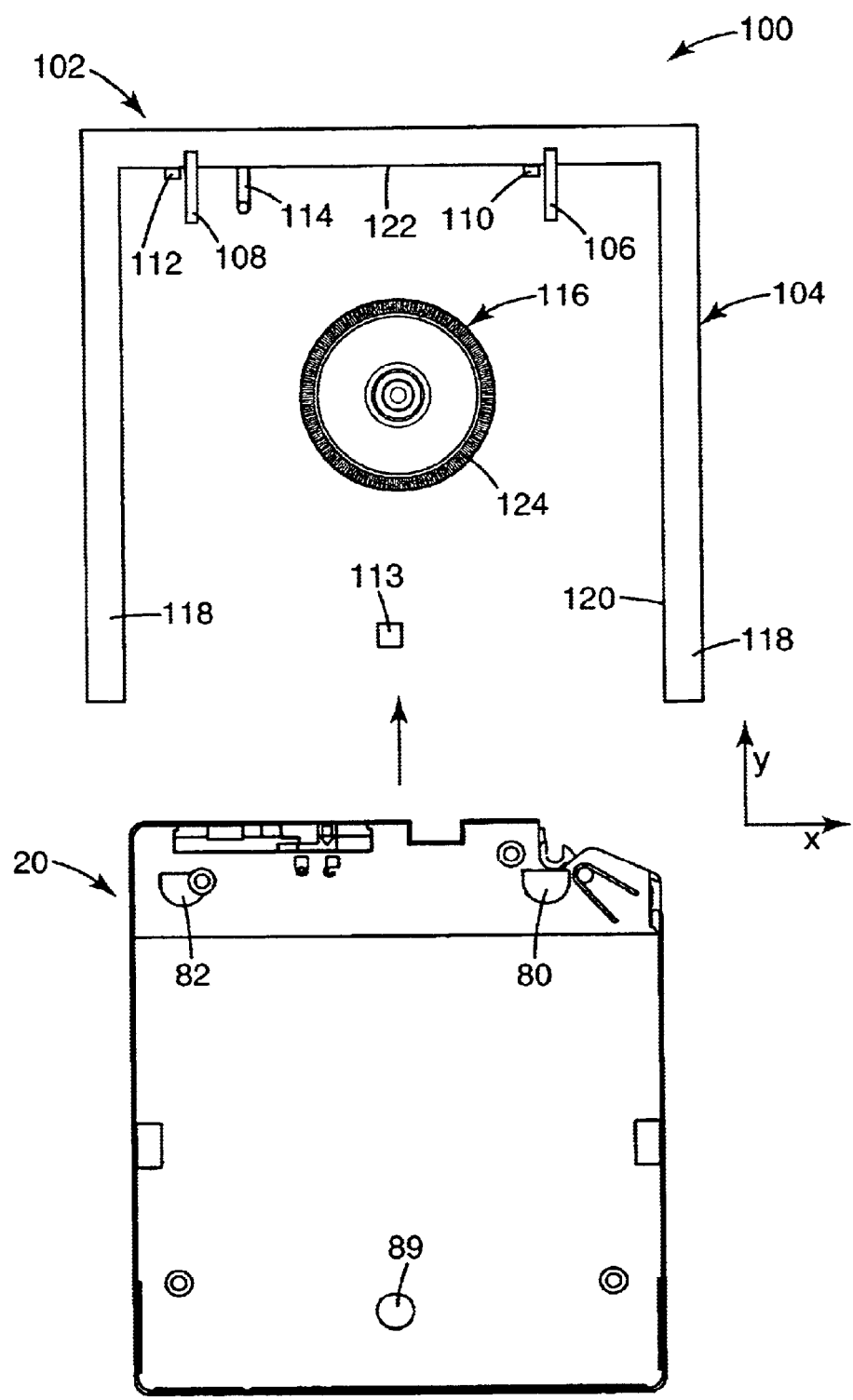
FIG. 5 is a simplified, top view of a tape drive system in accordance with the present invention, including a tape drive and the data storage tape cartridge of FIG. 1.

The above-described data storage tape cartridge 20 is configured for use as part of a tape drive system 100, including a tape drive 102 depicted in simplified form in FIG. 5. The tape drive 102 includes a receiving frame 104, first and second lateral registration devices 106, 108, first and second longitudinal registration devices 110, 112, a tilt registration device 113, a guide post 114, and a drive hub 116. As will be understood by one of ordinary skill, the tape drive 102 includes a number of additional components, that are not shown, including, for example, a threader mechanism, a take-up reel, read/write head(s), etc., which have been eliminated from the view of FIG. 5 for purposes of illustration. Further, the components 104–116 are depicted in highly simplified form. With this in mind, the registration devices 106–112, the guide post 114, and the drive hub 116 are associated with the receiving frame 104 such that upon insertion of the data storage tape cartridge 20 into the receiving frame 104, the drive hub 116 is aligned with the tape reel 40 (FIG. 1).

The receiving frame 104 includes frame members 118 that generally define an open, insertion end 120, and a trailing or back end 122 at which the front 64 of the data storage tape cartridge 20 is aligned following insertion thereof. The various registration devices 106–112 and the guide post 114 may be directly connected to the receiving frame 104 as generally shown in FIG. 5. Alternatively, however, the components 106–114 can be connected to, or otherwise associated with, the receiving frame 104 via additional connectors (not shown). In the view of FIG. 5, the tilt registration device 113 is depicted as being free-standing, it being understood that the tilt registration device 113 is, in fact, connected or otherwise associated with the frame 104, and in particular the lateral registration devices 106, 108. Regardless, the first and second lateral registration devices 106, 108 are sized and positioned to engage the first and second lateral datum pads 80, 82, respectively; the first and second longitudinal registration devices 110, 112 are sized and positioned to engage the first and second longitudinal datum pads 84, 86, (FIG. 2) respectively; the tilt registration device 113 is sized and positioned to engage the tilt datum point 89; and the guide post 114 is sized and positioned to engage the registration slot 88.

The drive hub 116 is configured to engage and rotate the tape reel 40 (FIG. 3). To this end, the drive hub 116 is precisely positioned relative to the registration devices 106–113 and the guide post 114. For example, an engagement surface 124 (shown as a toothed surface) of the drive hub 116 is positioned at a precise, known height (or lateral position) relative to the lateral registration device 106, 108 (into the page of FIG. 5). In a preferred embodiment, the drive hub 116 is configured to be moveable in the lateral direction. However, the tape drive 102 is of a greatly reduced size such that the drive hub 116 can only move a slight, lateral distance, on the order of 0.1 inch. This lateral movement is minimal as compared to available single reel tape drives that promote lateral drive hub movement in the range of 0.5–0.8 inch. Similarly, a central axis of the drive hub 116 is precisely positioned at a known longitudinal position (y-axis) relative to the longitudinal registration devices 110, 112. Finally, the drive hub 116 is precisely positioned such that the central axis is at a known side-to-side (x-axis) position relative to the guide post 114.

Figure 6:
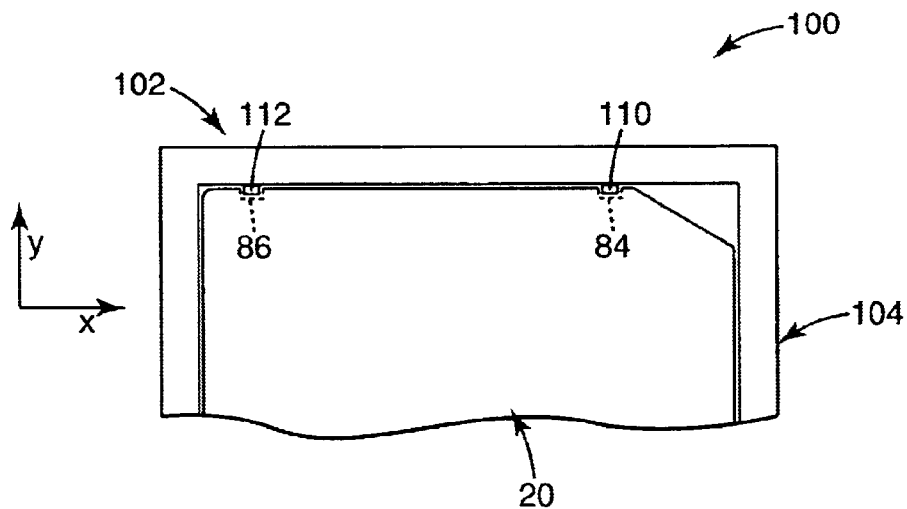
FIG. 6 is a top view of the tape drive system of FIG. 5 with the data storage tape cartridge inserted within the tape drive.

Interaction between the various datum pads 80–86 and the registration devices 106–112, as well as between the registration slot 88 and the guide post 114, following insertion of the data storage tape cartridge 20 into the receiving frame 104 is best described with reference to FIGS. 6–8. For example, FIG. 6 depicts, in simplified form, a top view of the data storage tape cartridge 20 inserted within the receiving frame 104. In this regard, the first and second longitudinal registration devices 110, 112, contact and engage the first and second longitudinal datum pads 84, 86, respectively. Notably, because the longitudinal registration devices 110, 112 contact the longitudinal datum pads 84, 86, the datum pads 84, 86 are hidden in FIG. 6. For clarification purposes, the longitudinal datum pads 84, 86 are referenced generally in FIG. 6. As previously described, the longitudinal datum pads 84, 86 identify a longitudinal or front-to-back (y-axis) position of the tape reel 40; whereas the longitudinal registration devices 110, 112 are positioned a precise longitudinal distance from the center or central axis of the drive hub 116 (FIG. 5). Effectively, then, engagement between the longitudinal registration devices 110, 112 and the longitudinal datum pads 84, 86 dictates that the tape reel 40 is aligned longitudinally or front-to-back (y-axis) with the drive hub 116. Further, the longitudinal datum pads 84, 86 are preferably co-planar, such that engagement thereof controls a longitudinal skew of the housing 22.

Figure 7:
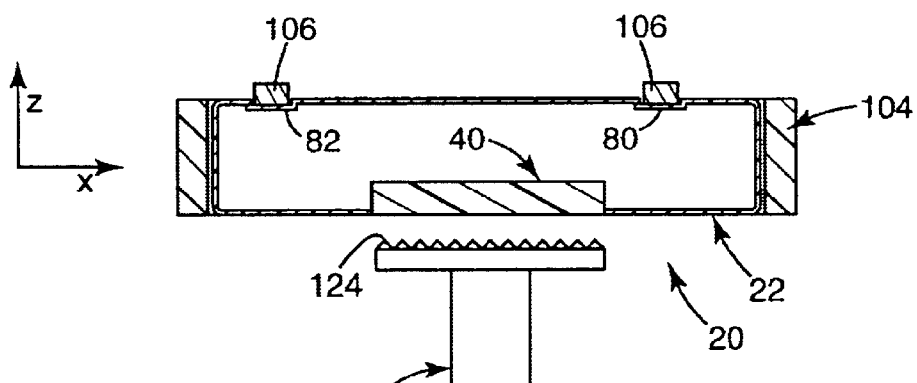
FIG. 7 is a simplified, side-sectional view of the system of FIG. 6.

Similarly, FIG. 7 provides a front, cross-sectional view of the first and second lateral datum pads 80, 82 being engaged by the first and second lateral registration devices 106, 108, respectively. This interaction dictates that the tape reel 40 is precisely positioned a minute distance above (z-axis) the engagement surface 124 of the drive hub 116 (FIG. 5), on the order of 0.1 inch. As a point of reference, a depth of the lateral datum pads 80, 82 has been greatly exaggerated in FIG. 7 for clarification. The lateral datum pads 80, 82 are preferably cop-lanar, such that engagement thereof by the lateral registration device 106, 108, respectively, controls a lateral skew of the housing 22. Further, with additional reference to FIG. 5, engagement of the tilt datum point 89 by the tilt registration device 113, in conjunction with engagement between the lateral datum pads 80, 82 and the lateral registration devices 106, 108 controls a tilt or zenieth of the housing 22, and thus of the tape reel 40.

Figure 8:
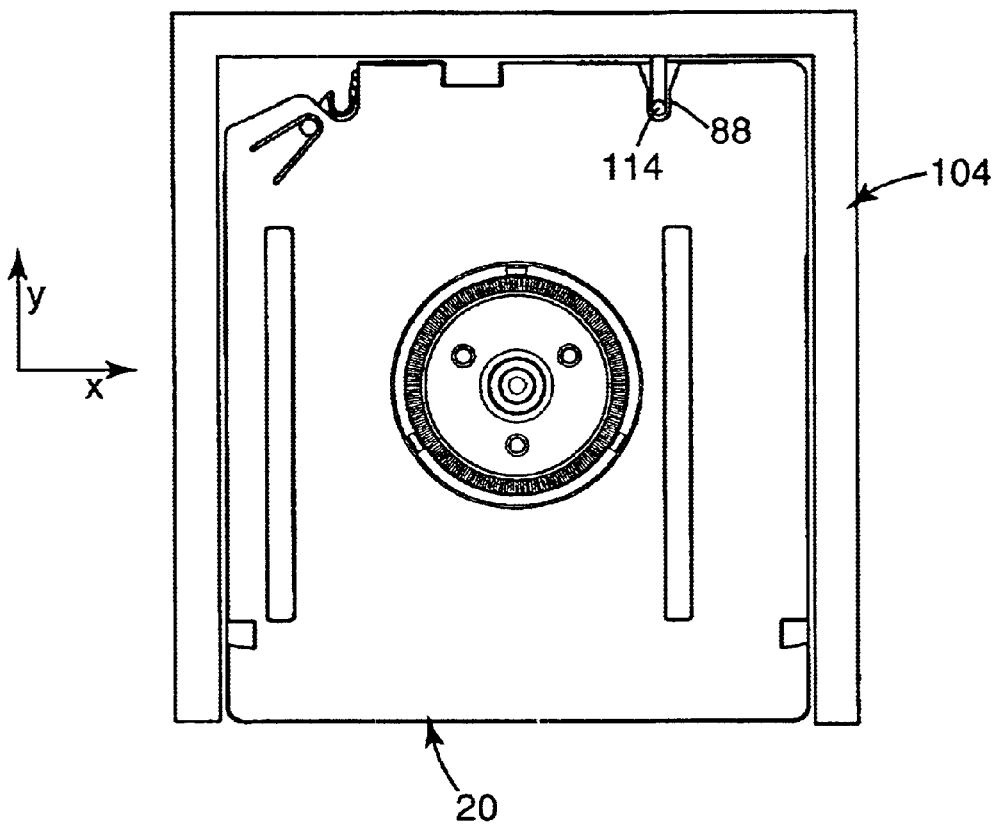
FIG. 8 is a simplified bottom view of the system of FIG. 6.

Finally, FIG. 8 is a partial, schematic bottom view of the data storage tape cartridge 20 inserted within the receiving frame 104, depicting engagement of the guide post 114 within the registration slot 88. As previously described, the registration slot 88 is precisely positioned at a known side-to-side location (x-axis) relative to a central axis or center of the tape reel 40, whereas the guide post 114 is precisely positioned at a known side-to-side location relative to a central axis or center of the drive hub 116. The guide post 114 is rigidly maintained relative to the frame 104 and the drive hub 116 (FIG. 5), such that the guide post 114 will direct the tape cartridge 20 to a certain side-to-side position upon engaging the registration slot 88. Thus, by engaging the registration slot 88, the guide post 114 dictates that the central axis or center of the tape reel 40 is precisely aligned from side-to-side (x-axis) with the central axis or center of the drive hub 116.

By preferably providing the data storage tape cartridge 20 with the alignment features 80–89, in conjunction with the corresponding registration features 106–114 of the tape drive 102, the resulting tape drive system 100 precisely aligns the tape reel 40 with the drive hub 116 upon insertion of the data storage tape cartridge 20 with the receiving frame 104. Unlike prior art, single reel tape drive systems, the tape drive system 100 of the present invention is highly compact, as it need account for minimal lateral drive hub movement (approximately 0.1 inch) and minimal drive hub misalignment in all other directions (on the order of 0.01 inch) as compared to prior art systems in which front-to-back and side-to-side deviations on the order of 0.1 inch are common.

Figure 9:
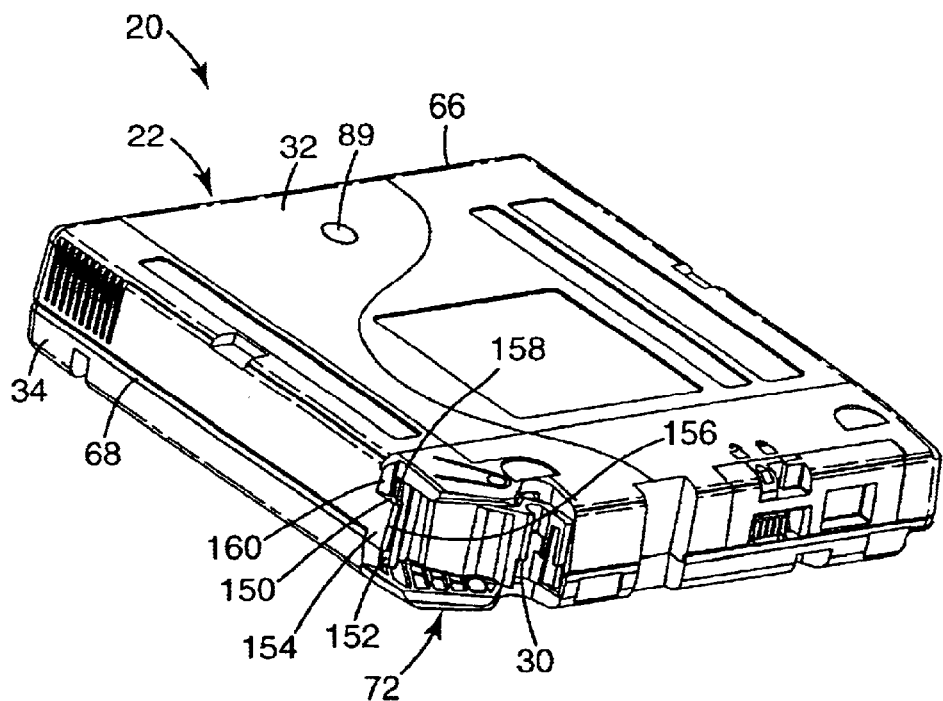
FIG. 9 is a side, perspective view of an alternative embodiment data storage tape cartridge in accordance with the present invention.

In another preferred embodiment of the present invention, the data storage tape cartridge is configured to be compatible with other existing handling devices, such as a library system rack. More particularly, and as shown as FIG. 9, the data storage tape cartridge 20 preferably includes first and second notches 150, 152 extending from the leader block window 72 that are sized to receive nesting features, such as fingers, (not shown) otherwise associated with a library system rack array (not shown). In one preferred embodiment, the first side 68 of the housing 22 forms a retention tab 154 configured to selectively retain the leader block 30 within the leader block window 72 when not in use. A leading wall 156 of the retention tab 154 defines the leader block window 72 relative to the first side 68. Further, the first side 68 forms the notches 150, 152 above and below, respectively, the retention tab 154. In a preferred embodiment, the notches 150, 152 are identical, each extending rearwardly from the leader block window 72. For example, the first notch 150 includes a longitudinal wall 158 (otherwise defined by the retention tab 154) and a lateral wall 160. So as to accommodate the dimensions of existing library system racks, the lateral wall 160 of the first notch 150 is positioned approximately a distance in the range of 3.9–4.0 inches, more preferably approximately 3.9375 inches (100 mm) from the back 66, whereas the leading wall 156 of the retention tab 154 is positioned a distance in the range of 4.0–4.1 inches, most preferably approximately 4.0625 inches (103 mm) from the back 66. The notches 150, 152 each preferably has a longitudinal length in the range of 0.1–0.2 inch (2.5–5 mm), most preferably approximately 0.14 inch (3.6 mm); and a height in the range of 0.1–0.2 inch and a height in the range of 0.1–0.2 inch (2.5–5 mm); most preferably approximately 0.17 inch (4.3 mm). These dimensions allow the data storage tape cartridge 20 to be conveniently retained within the library system rack array via passage of the nesting feature(s) (not shown) within the respective notches 150, 152. Further, the retention tab 154 provides sufficient surface area to properly retain the leader block 30 within the leader block window 72.

In a preferred embodiment, each of the notches 150, 152 extends through an entire thickness of the first side 68 of the housing 22. In a more preferred embodiment, the retention tab 154 is formed entirely by the cover 32, whereas the second notch 152 is defined by the base 34. Preferably, however, the notches 150, 152 are sized in accordance with dimensions of the leader block 30 such that when the data storage tape cartridge 20 is not in use, the leader block 30 effectively "blocks" the notches 150, 152. In other words, when not in use, internal components of the data storage tape cartridge 20, including the storage tape 26 are not "exposed" through the notches 150, 152. Depending upon the particular handling equipment, one or both of the notches 150, 152 can eliminated, and/or may assume other dimensions.

The data storage tape cartridge of the present invention provides a marked improvement over previous designs. In particular, the data storage tape cartridge of the present invention provides a single reel design with a number of datum features not otherwise found with prior art single reel cartridges. The corresponding tape drive is similarly configured. Thus, the resulting tape drive system is highly compact yet minimizes the opportunity for potential tape positioning errors. In one preferred embodiment, the data storage tape cartridge is compatible with existing handling devices such as library systems.

Although the present invention has been described with reference to preferred embodiments, workers skilled in the art will recognize changes can be made in form and detail without departing from the spirit and the scope of the present invention. For example, preferred dimensional characteristics have been ascribed to the various datum features of the data storage tape cartridge. These dimensional characteristics can be altered depending upon a preferred tape drive layout. Further, while the data storage tape cartridge has been described as preferably including a pair of lateral datum pads and a pair of longitudinal datum pads, a single lateral datum pad and/or a single longitudinal datum pad is also acceptable.

What is claimed is:

1. A data storage tape cartridge comprising:
    an exterior housing including a front, a back, a first side, a second side, a top, a bottom, a leader block window at a corner defined by the front and the first side, a first lateral datum pad formed in the top and a first longitudinal datum pad formed in the front, the first lateral datum pad and the first longitudinal datum pad being positioned in close proximity to the leader block window;
    a single tape reel rotatably maintained within the housing;
    a storage tape wrapped about the tape reel; and
    a leader block coupled to a leading end of the storage tape and selectively secured to the housing at the leader block window;
    wherein the first lateral datum pad is configured to identify a top-to-bottom position of the tape reel, and further wherein the first longitudinal datum pad is configured to identify a front-to-back position of the tape reel.

2. The data storage tape cartridge of claim 1, wherein the datum pads are formed as impressions in an exterior surface of the housing.

3. The data storage tape cartridge of claim 2, wherein the housing is plastic, and the datum pads are molded into the housing.

4. The data storage tape cartridge of claim 1, wherein the data storage tape cartridge is configured for insertion into a tape drive including a lateral registration device and a longitudinal registration device, the first lateral datum pad being configured for engagement with the lateral registration device and the first longitudinal datum pad being configured for engagement with the longitudinal registration device.

5. The data storage tape cartridge of claim 1, wherein the housing further forms an opening through the bottom for accessing the tape reel, and further wherein the first longitudinal datum pad has a known position relative to a center of the opening.

6. The data storage tape cartridge of claim 1, wherein the housing further includes a second lateral datum pad formed in the top and spaced from the first lateral datum pad, the second lateral datum pad being configured to identify a top-to-bottom position of the tape reel.

7. The data storage tape cartridge of claim 6, wherein the first and second lateral datum pads are aligned relative to the front of the housing.

8. The data storage tape cartridge of claim 6, wherein the first lateral datum pad is spaced from the second lateral datum pad by approximately 3 inches.

9. The data storage tape cartridge of claim 6, wherein the first lateral datum pad is positioned adjacent the leader block window and the second lateral datum pad is positioned adjacent the second side.

10. The data storage tape cartridge of claim 1, wherein the housing further includes a second longitudinal datum pad formed in the front and spaced from the first longitudinal datum pad, the second longitudinal datum pad being configured to identify a front-to-back position of the tape reel.

11. The data storage tape cartridge of claim 10, wherein the first and second longitudinal datum pads are aligned relative to the bottom of the housing.

12. The data storage tape cartridge of claim 10, wherein the first longitudinal datum pad is spaced from the second longitudinal datum pad by a distance in the range of approximately 2–2.5 inches.

13. The data storage tape cartridge of claim 10, wherein the first longitudinal datum pad is positioned adjacent the leader block window and the second longitudinal datum pad is positioned adjacent the second side.

14. The data storage tape cartridge of claim 1, wherein the housing further includes a registration slot formed at the front and extending along the bottom, the registration slot configured to define a side-to-side position of the tape reel.

15. The data storage tape cartridge of claim 14, wherein the registration slot is configured to slidably receive a post of a tape drive.

16. The data storage tape cartridge of claim 14, wherein the registration slot includes an entry section and a retaining section, the entry section being open at the front of the housing.

17. The data storage tape cartridge of claim 16, wherein the entry section tapers in width from the front to the retaining section for guiding the post into the retaining section.

18. The data storage tape cartridge of claim 14, wherein the registration slot is open at the front and along the bottom.

19. The data storage tape cartridge of claim 1, wherein the first side of the housing forms a retention tab adjacent the leader block window for selectively retaining the leader block to the housing, and further wherein a first notch is formed between the retention tab and the top.

20. The data storage tape cartridge of claim 19, wherein a second notch is formed between the retention tab and the bottom.

21. The data storage tape cartridge of claim 20, wherein the housing includes a cover and a base that combine to form the first side upon final assembly, the retention tab being formed by the cover.

22. The data storage tape cartridge of claim 19, wherein the first notch has a length of in the range of approximately 0.1–0.2 inch.

23. A data storage tape cartridge comprising:
    an exterior housing defined by a front, a back, a first side, a second side, a top, and a bottom, the housing forming:
        a leader block window at a corner defined by the front and the first side,
        first and second lateral datum pads impressed into and part of the exterior housing top,
        first and second longitudinal datum pads formed in the front,
        a registration slot formed in the front and extending along the bottom;
    a single tape reel rotatably maintained within the housing;
    a storage tape wrapped about the tape reel; and
    a leader block coupled to a leading end of the storage tape and selectively secured to the housing at the leader block window;
    wherein the lateral datum pads are configured to identify a top-to-bottom position of the tape reel, the longitudinal datum pads are configured to identify a front-to-back position of the tape reel, and the registration slot is configured to define a side-to-side position of the tape reel.

24. The data storage tape cartridge of claim 23, wherein the registration slot is positioned between the longitudinal datum pads.

25. The data storage tape cartridge of claim 24, wherein the first side of the housing forms a retention tab adjacent the leader block window for selectively retaining the leader block to the leader block window, and further forming a first notch between the retention tab and the top.

26. The data storage tape cartridge of claim 25, wherein a second notch is formed between the retention tab on the bottom.

27. A data storage tape drive system comprising:
  a data storage tape cartridge comprising:
    an exterior housing defined by a front, a back, a first side, a second side, a top and
    a bottom, the housing forming:
      a leader block window at a corner defined by the front and the first side,
      a first lateral datum pad formed in the top,
      a first longitudinal datum pad formed in the front,
      an opening formed through the bottom,
    a single tape reel rotatably maintained within the housing at the opening in the bottom,
    a storage tape wrapped about the tape reel,
    a leader block coupled to a leading end of the storage tape and selectively secured to the housing at the leader block window; and
  a tape drive including:
    a receiving frame,
    a rotatable drive hub configured to engage the tape reel,
    a first lateral registration device,
    a first longitudinal registration device;
  wherein the first lateral datum pad is engaged by the first lateral registration device and the first longitudinal datum pad is engaged by the first longitudinal registration device when the data storage tape cartridge is placed within the receiving frame to align the tape reel with the drive hub.

28. The tape drive system of claim 27, wherein interaction between the first lateral datum pad and the first lateral registration device positions the tape reel a precise distance above the drive hub.

29. The tape drive system of claim 28, wherein the precise distance is 0.1 inch.

30. The tape drive system of claim 27, wherein the tape reel has a front-to-back position relative to the housing, and the drive hub has a front-to-back position relative to the receiving frame, and further wherein the first longitudinal datum pad and the first longitudinal registration device are configured such that engagement therebetween aligns the front-to-back position of the tape reel with the front-to-back position of the drive hub.

31. The tape drive system of claim 27, wherein the housing further forms a registration slot in the front and extending along the bottom, and further wherein the tape drive includes a guide post, the registration slot being configured to receive the guide post upon insertion of the data storage tape cartridge within the receiving frame.

32. The tape drive system of claim 31, wherein the tape reel has a side-to-side position relative to the housing and the drive hub has a side-to-side position relative to the receiving frame, and further wherein the registration slot and the guide post are configured such that engagement therebetween aligns the side-to-side position of the tape reel with the side-to-side position of the drive hub.

33. The tape drive system of claim 27, wherein the housing further includes a second lateral datum pad formed in the top and the tape drive further includes a second lateral registration device, the second lateral datum pad being engaged by the second lateral registration device when the tape cartridge is inserted within the receiving frame.

34. The tape drive system of claim 27, wherein the housing further includes a second longitudinal datum pad formed on the front and the tape drive further includes a second longitudinal registration device, the second longitudinal datum pad being engaged by the second longitudinal registration device when the tape cartridge is inserted within the receiving frame.

* * * * *